Patented Jan. 16, 1951

2,538,049

UNITED STATES PATENT OFFICE 2,538,049

METHOD OF POLYMERIZING HIGH VINYL CHLORIDE-LOW VINYLIDENE CHLORIDE COPOLYMERS

John Leo Schick, Midland, Mich., assignor to The Dow Chemical Company, Midland, Mich., a corporation of Delaware No Drawing. Application May 21, 1949, Serial No. 94,731

4 Claims. (Cl. 260—87.7)

This invention relates to a method for polymerizing mixtures of from 50 to 95 per cent monomeric vinyl chloride and correspondingly from 50 to 5 per cent monomeric vinylidene chloride in non-emulsified aqueous suspension under such conditions as to avoid agglomeration of the polymerizing particles and to produce reasonably uniform particles of a stable copolymer at a practical rate.

There are three common general methods of polymerizing vinyl chloride and vinylidene chloride monomers. When a homogeneous mixture of the two monomers and catalyst is polymerized without a solvent or diluent, and as a single liquid phase, to form a solid polymeric block, the process is variously called "mass" or "homogeneous" polymerization. This is to contrast it with the emulsion process in which the water-immiscible monomers and catalyst are dispersed in water by means of a "surface active" or emulsifying agent, to form a latex-like dispersion of fine particles of the polymeric body. Another process consists in mixing the monomers and catalyst with water, without using an emulsifying agent, and maintaining the dispersion by continued agitation at a temperature known to induce polymerization. The last-outlined process is sometimes referred to as "granular" or "pearl" polymerization, but is also commonly called "suspension" polymerization. It is to this method of polymerization that the present invention relates.

Experience has shown that mixtures of monomeric vinylidene chloride and vinyl chloride of any relative proportions can be polymerized in aqueous suspension, using a per-oxygen compound as a catalyst. It is found, however, that the product is often unsatisfactory for any of several reasons. The principal problem has arisen through the strong tendency of these materials, when polymerizing, to pass through a sticky and agglomerative condition in which the particles tend to merge with one another and to form large polymeric aggregates. Thus, it happens that polymer particles are formed which vary widely in size and, because of the exothermic nature of the polymerization reaction and the low rate of heat transfer through the polymer, the product varies from very low molecular weight material at the core of the large lumps to very high molecular weight material in the water-cooled layers. The products are heterogeneous, both in size and quality. The problem is not solved by increasing the rate of agitation, since this serves to increase the opportunities for the sticky particles to agglomerate and later, when polymerization is nearly complete, results in grinding the polymer to a fine powder. Attempts have been made to keep the polymerizing particles isolated from one another by thickening the aqueous phase, using water-soluble gums or other protective colloids. These expedients are partially successful with those copolymers containing a preponderance of vinylidene chloride, but are relatively unsuccessful when applied to the copolymers rich in vinyl chloride. The tendency to agglomeration can be modified, in the case of high vinylidene chloride copolymers, by introducing particles of finished copolymer into the suspension, where they serve possibly as uniform nuclei for the freshly forming polymer, but this procedure, also, is ineffective with the high vinyl chloride copolymers.

The principal object of this invention is to provide a method for the copolymerization of a mixture of vinyl and vinylidene chlorides wherein vinyl chloride predominates, in non-emulsified aqueous suspension, to produce reasonably uniform fine polymeric particles of a stable copolymer at a practical rate.

In considering the problem, it appeared possible that the difficulties arising from agglomeration might be minimized or eliminated if the rate of polymerization could be increased and the duration of the sticky state be shortened. Any such increase in polymerization rate should be accomplished, if possible, without any great increase in temperature of the reaction, since it is known that molecular weight of polymers varies inversely with the polymerization temperature, other conditions being constant. Hence, consideration was given to the relative rates of polymerization obtained when using each of several polymerization catalysts. The systems subjected to test consisted of 3 parts by weight of water and 1 part by weight of a mixture of 75 per cent of vinyl chloride and 25 per cent of vinylidene chloride, by weight, together with 1 per cent of the catalyst under test. The monomers and catalyst were dispersed at a constant rate of agitation, in a closed system, to prevent loss of monomers, and the agitated suspension was kept at 50° C. for periods up to 120 hours. The extent of polymerization and the condition of the polymer product were noted. Typical results appear in Table I.

*Table I*

| Catalyst | Time, Hours | Per Cent Polymerization | Description of Polymer |
|---|---|---|---|
| Benzoyl peroxide | 48 | 13.2 | sticky mass. |
| Lauroyl peroxide | 48 | 15.8 | Do. |
| Hydrogen peroxide+Fe [1] | 120 | 35.1 | sticky mass on walls of vessel. |
| Sodium perborate | | Exploded | |
| Potassium persulfate | 48 | 27.0 | sticky mass. |
| 2,4-dichlorobenzoyl peroxide | 24 | 99.0 | hard white copolymer. |

[1] Note: 20 parts per million of iron, as ferric nitrate, in the aqueous phase.

None of the catalysts, except 2,4-dichlorobenzoyl peroxide, carried the reaction to a high enough conversion to polymer to pass beyond the objectionable sticky state, even though the reaction was continued in some cases as long as 120 hours. Even the rapid rate of polymerization obtained when using 2,4-dichlorobenzoyl peroxide failed to solve the problem, since the product was obtained only in the form of large hard lumps.

The tests were repeated, each mixture being modified by the addition of 2 per cent of a granulating agent, based on the weight of monomers, dissolved or suspended in the water phase. None of the tested granulating agents was effective when lauroyl peroxide, benzoyl peroxide, or potassium persulfate was used as catalyst in the system. A few of them exhibited a slight granulating action, but not enough to avoid the difficulties described above. When 2,4-dichlorobenzoyl peroxide was used as the catalyst, coarse granules were obtained with agar-agar as the granulating agent and the present problem appeared to be solved when using either powdered hydrated aluminum oxide or sulfonated polystyrene. The use of sulfonated polystyrene for the present purpose is the subject of a concurrently filed application, Serial No. 94,732, while the present application is concerned with the use of hydrated aluminum oxide powder. The particular aluminum oxide which has been found useful is gamma-aluminum hydroxide $$(Al_2O_3 \cdot 3H_2O)$$

a form which is the basis of the mineral gibbsite, or hydrargyllite. To be useful, the aluminum oxide should have a particle size of 100 mesh (U. S. sieve series) or finer. Material which passes a 300 mesh screen is preferred.

Among the materials which failed to effect satisfactory granulation of a copolymer of 75 per cent vinyl chloride and 25 per cent vinylidene chloride, in the presence of 2,4-dichlorobenzoyl peroxide, are: fully polymerized powder of the same copolymer, bentonite clay, calcium silicate, lead silicate, magnesium hydroxide, magnesium pyrophosphate, methyl cellulose, polyvinylidene chloride, polyvinyl chloride, the water-soluble sodium salt of polyacrylic acid, and silicic acid. When lauroyl peroxide, benzoyl peroxide or potassium persulfate were substituted for 2,4-dichlorobenzoyl peroxide and similar tests were conducted, none of the following additional agents produced satisfactory granulation of the same copolymer: calcium carbonate, carboxymethyl cellulose and its sodium salt, casein, water-soluble hydroxyethyl cellulose, gelatin, triethylene glycol, higher polyethylene glycols, gum arabic, gum tragacanth, pectin, polyvinyl alcohol, sodium alginate, starch and talc.

Not only is the troublesome and objectionable sticky stage avoided in the suspension copolymerization of 50 to 95 per cent vinyl chloride and 50 to 5 per cent vinylidene chloride using 2,4-dichlorobenzoyl peroxide and powdered hydrated aluminum oxide, but also the particular size of the copolymer is controllable by variation of the amount of aluminum oxide employed. Thus, when 1 per cent of this granulating agent is used, based on the weight of monomers originally present, the average particle size may be from 10 to 30 mesh (U. S. sieve series), while the use of 4 per cent of the same agent under otherwise identical conditions gives a product most of which passes a 30 mesh sieve and rests on a 50 mesh screen. This effect is illustrated in the following Table II, in which the original monomer mixture was 75–25 vinyl chloride-vinylidene chloride, the phase ratio was 2 parts by weight of water per part by weight of monomer mixture, the catalyst was 0.2 per cent of 2,4-dichlorobenzoyl peroxide, based on the weight of monomers, the temperature of polymerization was 50° C., and the reaction was carried out in 200 gallon batches in a closed 200 gallon kettle having an anchor type of agitator turning at 88 revolutions per minute.

*Table II*

| Aluminum Oxide Dust | Per Cent Copolymer Retained on Various Sieves | | | | | | |
|---|---|---|---|---|---|---|---|
| | 20 mesh | 30 | 50 | 70 | 100 | 200 | Pan |
| 1 per cent | 66.8 | 28.2 | 5.0 | 0 | 0 | 0 | 0 |
| 2 per cent | 17.1 | 57.3 | 15.8 | 0.6 | 0.6 | 1.2 | 7.3 |
| 3 per cent | 1.4 | 53.0 | 17.1 | 2.0 | 2.6 | 14.6 | 9.1 |
| 4 per cent | 0.9 | 2.5 | 64.8 | 4.3 | 3.2 | 14.3 | 10.1 |

It has been found, contrary to expectations, that, in the system just described, the particle size of the copolymer varies directly with the rate of agitation. That is, coarser particles are produced when the stirrer speed is increased, and finer particles are formed at low stirrer speeds, other factors being constant, so long as there is sufficient agitation to maintain dispersion of the polymerizing particles. This is illustrated in Table III, which reports the results of runs of the same size and composition as those in Table II, using 3 per cent aluminum oxide and varying the rate of agitation, as shown.

*Table III*

| Stirrer Speed | Per Cent Copolymer Retained on Various Sieves | | | | | | |
|---|---|---|---|---|---|---|---|
| | 20 Mesh | 30 | 50 | 70 | 100 | 200 | Pan |
| 122 R. P. M | 1.4 | 74.6 | 9.7 | 0.6 | 0.8 | 3.8 | 9.5 |
| 88 R. P. M | 1.4 | 53.0 | 17.1 | 2.0 | 2.6 | 14.6 | 9.1 |
| 75 R. P. M | 0 | 0.6 | 62.0 | 6.3 | 6.6 | 15.7 | 8.8 |
| 70 R. P. M | 0 | 0 | 80.0 | 3.9 | 2.6 | 6.4 | 7.1 |
| 65 R. P. M | 0 | 0 | 37.9 | 14.9 | 13.1 | 17.5 | 16.8 |

Other factors which have been found capable of influencing the particle size of the copolymer product are the ratio of water to monomer in the initial charge and the extent to which a given reaction vessel is loaded. These factors and their effects are noted in Table IV, in which the runs reported were carried out under identical conditions except for the variants listed. The monomers were those previously used, and there was 1 per cent aluminum oxide, 1 per cent of 2,4-dichlorobenzoyl peroxide, and 0.15 per cent of agar-agar in each batch.

Table IV

| Phase Ratio, Wt. Water/Wt. Monomer | Load, Per Cent of Capacity | Per Cent Copolymer Retained on Various Sieves | | | |
|---|---|---|---|---|---|
| | | 10 mesh | 20 | 30 | Pan |
| 1:1 | 67 | 16.6 | 57.3 | 14.5 | 11.6 |
| 2:1 | 67 | 12.5 | 50.0 | 17.7 | 19.8 |
| 3:1 | 67 | 11.1 | 40.1 | 20.7 | 28.1 |
| 1:1 | 33 | 17.8 | 65.3 | 3.8 | 13.1 |
| 1:1 | 67 | 9.9 | 54.0 | 17.0 | 13.3 |
| 1:1 | 100 | 0.6 | 54.1 | 27.0 | 17.9 |

The various copolymerizations reported herein have illustrated the use of as little as 0.2 per cent and as much as 1 per cent of 2,4-dichlorobenzoyl peroxide, based on the weights of monomers. To illustrate the effects of various amounts of this catalyst in the described system, a series of runs is reported in Table V, all carried out using a temperature of 50° C., a ratio of 3 parts of water to 1 part of monomer, by weight, 0.15 per cent of agar-agar based on the weight of monomers and 1 per cent of aluminum oxide dust. The variables appear in the table. The runs were stopped after the indicated periods of time and the yield of polymer was determined.

Table V

| Per Cent Catalyst | Duration of Reaction, Hours | Per Cent Conversion of Monomers to Copolymer |
|---|---|---|
| 1.0 | 8 | 19.2 |
| 1.0 | 16 | 62.1 |
| 1.0 | 24 | 92.8 |
| 0.5 | 8 | 13.6 |
| 0.5 | 24 | 73.1 |
| 0.5 | 40 | 95.4 |
| 0.2 | 8 | 8.0 |
| 0.2 | 32 | 47.5 |
| 0.2 | 56 | 87.2 |
| 0.2 | 80 | 99.2 |

The result desired in the form and quality of the copolymer product are not obtained ordinarily until at least 70 per cent conversion of monomers to copolymer has been attained. The foregoing table gives an indication of the time needed to reach this level under different conditions.

The product, as obtained directly from the present process, has a significantly lower content of residual volatile monomer than that usually encountered, and the volatile content of the copolymer particles is found here to be directly proportional to the average size of the particles. Thus, when the particle size is decreased, as described above, either by reducing the rate of agitation or by increasing the amount of aluminum oxide used, the volatile content of the product is reduced. This is illustrated in Table VI, reporting runs in which the only variables are those listed in the table.

Table VI

| Stirrer Speed, R. P. M. | Per Cent Aluminum Oxide | Residual volatile Content of Copolymer, Per Cent |
|---|---|---|
| 122 | 3.0 | 2.40 |
| 88 | 3.0 | 1.75 |
| 75 | 3.0 | 1.50 |
| 70 | 3.0 | 1.10 |
| 65 | 3.0 | 0.86 |
| 88 | 1.0 | 2.50 |
| 88 | 3.0 | 1.75 |
| 88 | 4.0 | 1.40 |

The volatile content may be reduced to even lower values by steaming the aqueous polymer suspension to produce therein a temperature of 90° to 100° C. for periods of 1 to 15 minutes or more. Such treatment has resulted in fine copolymer particles with residual volatile content below 0.25 per cent. The so-treated polymer did not exhibit discoloration on standing for two months, while samples which contained 2 per cent of residual monomer turned slightly yellow in a like period.

Even greater refinement of the particle size than that noted above may be obtained if there is dissolved in the aqueous phase from 1 to 15 per cent of sodium carbonate, based on the weight of monomers. This effect is illustrated with respect to two comparable runs as to which the operating data are given below:

| | A | B |
|---|---|---|
| Water, pounds | 1,000 | 1,000 |
| 2,4-Dichlorobenzoyl peroxide, pounds | 2 | 2 |
| Hydrated aluminum oxide powder, pounds | 12 | 12 |
| Sodium carbonate, pounds | 40 | 0 |
| Vinylidene chloride monomer, pounds | 100 | 100 |
| Vinyl chloride monomer, pounds | 300 | 300 |
| Temperature, °C | 50 | 50 |
| Time, hours | 27 | 27 |
| Conversion to copolymer, per cent | 78.3 | 78.3 |

The screen analysis of the products shows batch "A" to be much finer than batch "B." The results are shown in Table VII.

Table VII

| Batch | Per Cent of Copolymer Retained on Various Sieves | | | | | | |
|---|---|---|---|---|---|---|---|
| | 20 mesh | 30 | 50 | 70 | 100 | 200 | Pan |
| A | 0 | 0.1 | 0.1 | 0.2 | 2.2 | 80.0 | 17.4 |
| B | 0 | 0 | 3.4 | 71.0 | 10.1 | 9.7 | 5.7 |

The product does not become appreciably finer when higher concentrations of sodium carbonate are used, and results comparable to those obtained in batch "A," above, are obtained when using from 5 to 10 per cent of sodium carbonate, based on the weight of monomer. When the amount of sodium carbonate is reduced to as little as 1 per cent, the polymer particles, in the herein-described system, are always appreciably finer than those made under otherwise identical conditions but without the sodium carbonate.

The invention has been illustrated with respect to the copolymerization of mixtures of about 75 per cent vinyl chloride and 25 per cent vinylidene chloride, by weight. The same problem exists and the same procedure has been found to apply with like advantage in the copolymerization of mixtures of from 50 to 95 per cent vinyl chloride and correspondingly from 50 to 5 per cent of vinylidene chloride. In each case, the suspension polymerization of such a mixture in the presence of 2,4-dichlorobenzoyl peroxide and hydrated aluminum oxide dust, with or without sodium carbonate being present, produces a copolymer at a practical rate and without any of the disadvantages arising from agglomeration of sticky particles. It is not generally economical to carry out the process in the presence of more than 4 nor less than 1 part by weight of water per part of the monomer mixture.

When molded test specimens of a copolymer made according to the present invention are compared with similar specimens molded from a standard commercial copolymer of the same analysis made in aqueous emulsion, the product of this invention is at least as resistant to discoloration by light and heat as is the emulsion polymer. When modified with the usual stabilizers, the copolymers of this process are more resistant to discoloration by light and heat than are the similarly modified copolymers made in aqueous emulsion.

I claim:

1. The method which comprises copolymerizing a non-emulsified aqueous suspension of a mixture of monomers consisting of from 50 to 95 per cent vinyl chloride and correspondingly from 50 to 5 per cent vinylidene chloride in a closed system to prevent loss of monomer vapor, in the presence of from 0.2 to 1 per cent of their weight of 2,4-dichlorobenzoyl peroxide and from 1 to 5 per cent of their weight of gamma-aluminum hydroxide powder having a particle size to pass a 100 mesh screen (U. S. sieve series), the weight ratio of water to monomers being from 1:1 to 4:1, and maintaining dispersion of the polymerizing particles by agitation at a temperature from 25° to 65° C. until at least 70 per cent polymerization has occurred.

2. The method which comprises copolymerizing a non-emulsified aqueous suspension of a mixture of monomers consisting of from 50 to 95 per cent vinyl chloride and correspondingly from 50 to 5 per cent vinylidene chloride in a closed system to prevent loss of monomer vapor, in the presence of from 0.2 to 1 per cent of their weight of 2,4-dichlorobenzoyl peroxide, from 1 to 5 per cent of their weight of gamma-aluminum hydroxide powder having a particle size to pass a 100 mesh screen (U. S. sieve series), and from 1 to 15 per cent of their weight of sodium carbonate, the weight ratio of water to monomers being from 1:1 to 4:1, and maintaining dispersion of the polymerizing particles by agitation at a temperature from 25° to 65° C. until at least 70 per cent polymerization has occurred.

3. The method claimed in claim 1, wherein the mixture of monomers is one consisting of 75 per cent vinyl chloride and 25 per cent vinylidene chloride.

4. The method claimed in claim 2, wherein the mixture of monomers is one consisting of 75 per cent vinyl chloride and 25 per cent vinylidene chloride.

JOHN LEO SCHICK.

REFERENCES CITED

The following references are of record in the file of this patent:

UNITED STATES PATENTS

| Number | Name | Date |
|---|---|---|
| 2,354,775 | Rummelsburg | Aug. 1, 1944 |
| 2,455,225 | Burroughs | Nov. 30, 1948 |
| 2,485,270 | Folt | Oct. 18, 1949 |

OTHER REFERENCES

Jellinek et al., Ind. & Eng. Chem., vol. 37, No. 2, 1945, pp. 158 and 163.

Palache et al., Dana's System of Mineralogy, 7th Ed., 1944, vol. I, page 663.